United States Patent
Park

(10) Patent No.: US 10,587,001 B2
(45) Date of Patent: Mar. 10, 2020

(54) LITHIUM BATTERY

(71) Applicant: SAMSUNG SDI CO., LTD., Yongin-si, Gyeonggi-do (KR)

(72) Inventor: Youngjin Park, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 102 days.

(21) Appl. No.: 15/144,028

(22) Filed: May 2, 2016

(65) Prior Publication Data

US 2016/0329597 A1 Nov. 10, 2016

(30) Foreign Application Priority Data

May 8, 2015 (KR) .......................... 10-2015-0064897

(51) Int. Cl.
*H01M 10/0525* (2010.01)
*H01M 10/0585* (2010.01)
(Continued)

(52) U.S. Cl.
CPC ....... *H01M 10/0525* (2013.01); *H01M 4/131* (2013.01); *H01M 4/136* (2013.01); *H01M 4/366* (2013.01); *H01M 4/505* (2013.01); *H01M 4/525* (2013.01); *H01M 4/5825* (2013.01); *H01M 10/0413* (2013.01); *H01M 10/0431* (2013.01); *H01M 10/0436* (2013.01); *H01M 10/0585* (2013.01); *H01M 10/0587* (2013.01); *H01M 10/0562* (2013.01); *H01M 2004/028* (2013.01)

(58) Field of Classification Search
CPC .. H01M 10/0525; H01M 4/131; H01M 4/136; H01M 4/366; H01M 4/505; H01M 4/525; H01M 4/5825; H01M 10/0413; H01M 10/0431; H01M 10/0436; H01M 10/0585; H01M 10/0587; H01M 10/0562; H01M 2004/028

See application file for complete search history.

(56) References Cited

U.S. PATENT DOCUMENTS 5,702,995 A 12/1997 Fu
6,030,909 A 2/2000 Fu
(Continued)

FOREIGN PATENT DOCUMENTS

CN 104600240 A * 5/2015 .......... H01M 2/1646
JP 2013077529 A * 4/2013
(Continued)

OTHER PUBLICATIONS

Sun, Yang-Kook, et al. "High-energy cathode material for long-life and safe lithium batteries." Nature materials 8.4 (2009): 320-324.*
(Continued)

*Primary Examiner* — Stewart A Fraser
(74) *Attorney, Agent, or Firm* — Lee IP Law, PC

(57) ABSTRACT

A lithium battery includes a first electrode assembly, a second electrode assembly, and a third electrode assembly in a case. The first electrode assembly and the second electrode assembly include a first lithium ion conductor layer and a second lithium ion conductor layer, respectively. The third electrode assembly includes a ceramic layer which is at least one of between a positive electrode and a separator or between a negative electrode and a separator.

15 Claims, 5 Drawing Sheets

(51) Int. Cl.
*H01M 4/131* (2010.01)
*H01M 4/136* (2010.01)
*H01M 4/36* (2006.01)
*H01M 4/505* (2010.01)
*H01M 4/58* (2010.01)
*H01M 10/04* (2006.01)
*H01M 10/0587* (2010.01)
*H01M 4/525* (2010.01)
*H01M 10/0562* (2010.01)
*H01M 4/02* (2006.01)

(56) References Cited

U.S. PATENT DOCUMENTS

| | | |
|---|---|---|
| 6,315,881 B1 | 11/2001 | Fu |
| 2003/0013012 A1 | 1/2003 | Ahn et al. |
| 2004/0126653 A1 | 7/2004 | Visco et al. |
| 2007/0015061 A1* | 1/2007 | Klaassen .................. H01M 4/13 429/322 |
| 2007/0231704 A1* | 10/2007 | Inda .......................... C03B 19/06 429/322 |
| 2010/0019208 A1* | 1/2010 | Choi ....................... B82Y 30/00 252/506 |
| 2010/0190081 A1 | 7/2010 | Park et al. |
| 2011/0183166 A1* | 7/2011 | Suga ......................... H01M 2/30 429/61 |
| 2013/0089761 A1* | 4/2013 | Schiemann ......... H01M 2/0242 429/61 |
| 2013/0273401 A1* | 10/2013 | Lee .......................... H01M 2/08 429/82 |
| 2014/0045032 A1* | 2/2014 | Tanaka ................ H01M 10/045 429/144 |
| 2014/0113176 A1* | 4/2014 | Muramatsu ......... H01M 2/1646 429/145 |
| 2014/0124701 A1* | 5/2014 | Vanhatalo .............. C01G 51/00 252/182.1 |
| 2014/0154586 A1* | 6/2014 | Hayashi .............. H01M 10/052 429/322 |
| 2014/0193689 A1* | 7/2014 | Takami ............. H01M 10/0562 429/120 |
| 2015/0132626 A1 | 5/2015 | Park et al. |
| 2016/0028064 A1* | 1/2016 | Choi .................... H01M 2/1646 429/145 |
| 2016/0308250 A1* | 10/2016 | Jeong .................... H01M 4/661 |

FOREIGN PATENT DOCUMENTS

| | | |
|---|---|---|
| KR | 10-2001-0082058 A | 8/2001 |
| KR | 10-2007-0118715 A | 12/2007 |
| KR | 10-2012-0118511 A | 10/2012 |
| KR | 20130038795 A * | 4/2013 |
| KR | 10-2015-0054290 A | 5/2015 |

OTHER PUBLICATIONS

Northrop, Paul WC, et al. "Coordinate transformation, orthogonal collocation, model reformulation and simulation of electrochemical-thermal behavior of lithium-ion battery stacks." Journal of the Electrochemical Society 158.12 (2011): A1461-A1477.*

English machine translation of Sasaki et al. JP 2013077529 A (Year: 2013).*

English machine translation of Park et al. (KR 20130038795 A) (Year: 2013).*

* cited by examiner

LITHIUM BATTERY

CROSS-REFERENCE TO RELATED APPLICATION

Korean Patent Application No. 10-2015-0064897, filed on May 8, 2015, and entitled, "Lithium Battery," is incorporated by reference herein in its entirety.

BACKGROUND

1. Field

One or more embodiments described herein relate to a lithium battery.

2. Description of the Related Art

Secondary batteries are often used to power small, high-tech electronic devices such as digital cameras, mobile devices, and laptop computers. Medium to large size secondary batteries are used to power electric vehicles.

Examples of secondary batteries include nickel-cadmium batteries, nickel-metal hydride batteries, nickel-hydrogen batteries, and lithium batteries. Lithium batteries have higher operating voltages and energy density per unit weight than nickel-cadmium batteries or nickel-metal hydride batteries, and therefore may be connected in series for many high-power applications.

SUMMARY

In accordance with one or more embodiments, a lithium battery includes a case; a first electrode assembly includes a first positive electrode, a first negative electrode, a first A-separator between the first positive electrode and the first negative electrode, and a first lithium ion conductor layer which is at least one of on an outer surface of the first positive electrode, between the first positive electrode and the first A-separator, between the first A-separator and the first negative electrode, or on an outer surface of the first negative electrode; a second electrode assembly including a second positive electrode, a second negative electrode, a second A-separator disposed between the second positive electrode and the second negative electrode, and a second lithium ion conductor layer which is at least one of on an outer surface of the second positive electrode, between the second positive electrode and the second A-separator, between the second A-separator and the second negative electrode, or on an outer surface of the second negative electrode; and a third electrode assembly including a third positive electrode, a third negative electrode, a third A-separator disposed between the third positive electrode and the third negative electrode, and a ceramic layer which is at least one of between the third positive electrode and the third A-separator or between the third negative electrode and the third A-separator, wherein the first electrode assembly and the second electrode assembly are in and adjacent to an interior surface of the case, and the third electrode assembly is between the first electrode assembly and the second electrode assembly.

The first electrode assembly may include a first B-separator on at least one of an outer surface of the first positive electrode or an outer surface of the first negative electrode, the second electrode assembly may include a second B-separator on at least one of an outer surface of the second positive electrode or an outer surface of the second negative electrode, and the third electrode assembly may include a third B-separator on at least one of an outer surface of the third positive electrode or an outer surface of the third negative electrode.

The first lithium ion conductor layer may be at least two of on an outer surface of the first positive electrode, between the first positive electrode and the first A-separator, between the first A-separator and the first negative electrode, or on an outer surface of the first negative electrode, and the second lithium ion conductor layer may be at least two of on an outer surface of the second positive electrode, between the second positive electrode and the second A-separator, between the second A-separator and the second negative electrode, or on an outer surface of the second negative electrode.

The first, second, and third electrode assemblies may be a jelly-roll or a stack type. The first positive electrode may include a first positive electrode current collector and a first positive active material layer including a first positive active material, the first positive active material layer may be on at least one surface of the first positive electrode current collector, the second positive electrode may include a second positive electrode current collector and a second positive active material layer including a second positive active material, the second positive active material layer may be on at least one surface of the second positive electrode current collector, the third positive electrode may include a third positive electrode current collector and a third positive active material layer including a third positive active material, and the third positive active material layer may be on at least one surface of the third positive electrode current collector.

Each of the first positive active material and the second positive active material may independently include at least one of a lithium-nickel composite oxide represented by Formula 1, an olivine-based phosphoric acid compound represented by Formula 2, or a spinel-based lithium-manganese composite oxide represented by Formula 3, and the third positive active material may include a lithium-nickel composite oxide represented by Formula 4, where:

Formula 1 is $Li_a(Ni_xMe_y)O_2$, where Me is at least one of cobalt (Co), manganese (Mn), iron (Fe), vanadium (V), copper (Cu), chromium (Cr), aluminum (Al), magnesium (Mg), or titanium (Ti), with $0.9 < a \leq 1.1$, $0 \leq x < 0.6$, $0.4 \leq y \leq 1$, and $x+y=1$, Formula 2 is $LiMe'PO_4$, where Me' is at least one of Fe, Mn, Ni, Co, or V;

Formula 3 is $Li_{1+y}Mn_{2-y-z}M_zO_{4-x}Q_x$, where M is at least one of Mg, Al, Ni, Co, Fe, Cr, Cu, B, Ca, Nb, Mo, Sr, antimony (Sb), tungsten (W), Ti, V, Zr, or Zn, and Q is at least one of nitrogen (N), fluorine (F), sulfur (S), or chlorine (Cl), with $0 \leq x \leq 1$, $0 \leq y \leq 0.34$, and $0 \leq z \leq 1$; and Formula 4 is $Li_a(Ni_xM'_yM''_z)O_2$, where M' is at least one of Co, Mn, Ni, Al, Mg, or Ti, M'' is at least one of Ca, Mg, Al, Ti, Sr, Fe, Co, Ni, Cu, Zn, Y, Zr, Nb, and B, or a combination thereof, with $0.4 < a \leq 1.3$, $0.6 \leq x \leq 1$, $0 \leq y \leq 0.4$, $0 \leq z \leq 0.4$, and $x+y+z=1$.

Me may be substituted or doped with at least one heterogeneous element of calcium (CA), magnesium (Mg), aluminum (Al), titanium (Ti), strontium (Sr), iron (Fe), cobalt (Co), nickel (Ni), copper (Cu), zinc (Zn), yttrium (Y), zirconium (Zr), niobium (NB), or boron (B). The third positive active material may include a lithium-nickel composite oxide represented by Formula 5 which is $Li_a(Ni_xCo_yMn_z)O_2$, where $0.7 < a \leq 1.3$, $0.6 \leq x \leq 1$, $0 \leq y \leq 0.4$, $0 \leq z \leq 0.4$, and $x+y+z=1$.

The ceramic layer may be bonded to at least one surface of the third A-separator. The ceramic layer may include an inorganic material and a binder, and the inorganic material may be one of a metal oxide, a metalloid oxide, a metal fluoride, a metal hydroxide, or a combination thereof. The inorganic material may be one of $Al_2O_3$, $SiO_2$, $TiO_2$, $SnO_2$, $CeO_2$, MgO, NiO, CaO, ZnO, $ZrO_2$, $Y_2O_3$, $SrTiO_3$, $BaTiO_3$, $Mg(OH)_2$, MgF, or a combination thereof.

The binder may be one of polyvinylidene fluoride-co-hexafluoropropylene, polyvinylidene fluoride-co-trichloroethylene, polymethyl methacrylate, polyacrylonitrile, polyvinylpyrrolidone, polyvinyl acetate, polyethylene-co-vinyl acetate, polyimide, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxyl methyl cellulose, polyvinyl alcohol, or a combination thereof.

Each of the first lithium ion conductor layer and the second lithium ion conductor layer may include a lithium superionic conductor (LISICON), a Garnet lithium ion conductor, a Perovskite lithium ion conductor, a lithium phosphorus oxinitride (LIPON) lithium ion conductor, a Na superionic conductor (NASICON), or a combination thereof.

A thickness of the first lithium ion conductor layer and a thickness of the second lithium ion conductor layer may each be in a range of about 5 nm to about 500 µm. A thickness of the first positive electrode current collector and a thickness of the second positive electrode current collector may each be about 1 to about 2 times greater than a thickness of the third positive electrode current collector, and a thickness of the first negative electrode current collector and a thickness of the second negative electrode current collector may each be about 1 to about 2 times greater than a thickness of the third negative electrode current collector. A thickness of the first A-separator and a thickness of the second A-separator may each be about 1 to about 2 times greater than a thickness of the third A-separator.

In accordance with one or more other embodiments, a lithium battery includes a positive electrode; a negative electrode; a first electrode assembly having a first lithium ion conductor layer; a second electrode assembly having second lithium ion conductor layer; and a third electrode assembly including a ceramic layer which is at least one of between the positive electrode and a separator or between the negative electrode and a separator.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
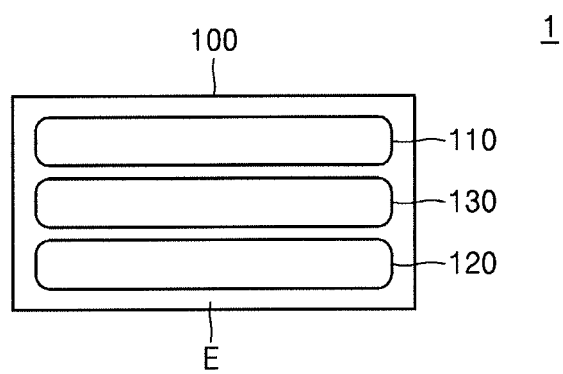
FIG. 1 illustrates an embodiment of a lithium battery.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

An electrode assembly may be inserted in a case having a rectangular form, a cylindrical form, or a pouch form. Then, an electrolyte solution may be injected into the case. The electrode assembly may be classified depending on its structure. Examples include a jelly-roll type and a stack type. In a jelly-roll type electrode assembly, a stack of a positive electrode and a negative electrode in long-sheet form is wound, with a separator between the positive and negative electrode. In a stack-type electrode assembly, a stack of a plurality of positive electrodes, a plurality of separators, and a plurality of negative electrodes of predetermined size are alternately stacked upon one another in the stated order.

FIG. 1 is a cross-sectional view illustrating an embodiment of a lithium battery 1 which includes a plurality of electrode assemblies 110, 120, and 130 in a case 100. The electrode assemblies may be impregnated with an electrolyte E. The first and second electrode assemblies 110 and 120 are adjacent to the case 100, and the third electrode assembly 130 is between the first and second electrode assemblies 110 and 120.

The first electrode assembly 110 may include a first positive electrode, a first negative electrode, a first A-separator between the first positive electrode and the first negative electrode, and a first lithium ion conductor layer which is at least one of on an outer surface of the first positive electrode, between the first positive electrode and the first A-separator, between the first A-separator and the first negative electrode, or on an outer surface of the first negative electrode.

The second electrode assembly 120 may include a second positive electrode, a second negative electrode, a second A-separator between the second positive electrode and the second negative electrode, and a second lithium ion conductor layer which is at least one of on an outer surface of the second positive electrode, between the second positive electrode and the second A-separator, between the second A-separator and the second negative electrode, or on an outer surface of the second negative electrode.

The third electrode assembly 130 may include a third positive electrode, a third negative electrode, a third A-separator between the third positive electrode and the third negative electrode, and a ceramic layer which is at least one of between the third positive electrode and the third A-separator or between the third negative electrode and the third A-separator.

Increasing the energy density of a lithium battery has been found to deteriorate the safety of the lithium battery. For example, during charging of the lithium secondary battery, lithium dendrites may form and grow from plating of lithium ions on a negative electrode. Consequently, they may penetrate a separator to cause an internal short. This may cause heat generation, fire, or thermal runaway in the lithium battery and/or may rupture the lithium battery.

In accordance with one or more embodiments described herein, in the electrode assemblies 110 and 120, the lithium ion conductor layer transfers lithium ions from the positive electrode to the negative electrode during charging or from the negative electrode to the positive electrode during discharging. When the lithium ion conductor layer is between the positive electrode and the negative electrode, the lithium ion conductor layer prevents contact between the positive and negative electrodes and migration of materials separated from the positive or negative electrode into the other electrode. Thus, the lithium ion conductor serves as a separator.

Furthermore, the lithium ion conductor layer may have relatively high lithium ion conductivity. When such a lithium ion conductor layer is between the positive and negative electrodes, an electrolyte assembly may be formed without requiring additional liquid electrolyte. Also, in this configuration, lithium dendrites may be less likely to grow on the negative electrode to contact the positive electrode during repeated charge and discharge cycles. The likelihood of an internal short forming, and thus thermal runaway from occurring, may therefore be reduced or prevented, even when the separator is penetrated by the dendrites.

Furthermore, the ceramic layer in the third electrode assembly 130 may suppress expansion of an internal short by preventing current concentration at a defect site, even if there is an internal short due to melting of a separator. Accordingly, the third electrode assembly 130 including a ceramic layer may be placed at the center of the electrode assembly of the lithium battery 1 to suppress an increase or expansion of an internal short.

Furthermore, the first and second electrode assemblies 110 and 120 including a lithium ion conductor layer may be disposed on respective sides of the third electrode assembly 130, to thereby release heat and disperse current of the lithium battery 1. Thus, safety of the lithium battery 1 may be improved.

In one embodiment, the first electrode assembly 110 may further include a first B-separator on at least one of an outer surface of the first positive electrode or an outer surface of the first negative electrode. The second electrode assembly 120 may further include a second B-separator on at least one of an outer surface of the second positive electrode or an outer surface of the second negative electrode. The third electrode assembly 130 may further include a third B-separator on at least one of an outer surface of the third positive electrode or an outer surface of the third negative electrode.

The outer surface may be, for example, a surface of one of the positive or negative electrode which does not face the other of the positive or negative electrode. Thus, in the case of the first electrode assembly 110, the outer surface of the first positive electrode may indicate a surface that is not adjacent to the first A-separator. The outer surface of the first negative electrode may indicate a surface that is not adjacent to the first A-separator. The outer surface of the positive electrode or negative electrode in the second and third electrode assemblies 120 and 130 may be the same as in the first electrode assembly 110.

The first lithium ion conductor layer may be disposed in at least two of an outer surface of the first positive electrode between the first positive electrode and the first A-separator, between the first A-separator and the first negative electrode, or on an outer surface of the first negative electrode. The second lithium ion conductor layer may be disposed in at least two of an outer surface of the second positive electrode between the second positive electrode and the second A-separator, between the second A-separator and the second negative electrode, or on an outer surface of the second negative electrode. Therefore, the safety of the lithium battery 1 may further improved.

In one embodiment, the first, second, and third electrode assemblies 110, 120, and 130 may be a jelly-roll type. When this is the case, a high energy density per unit weight thereof may be obtained.

Figure 2:
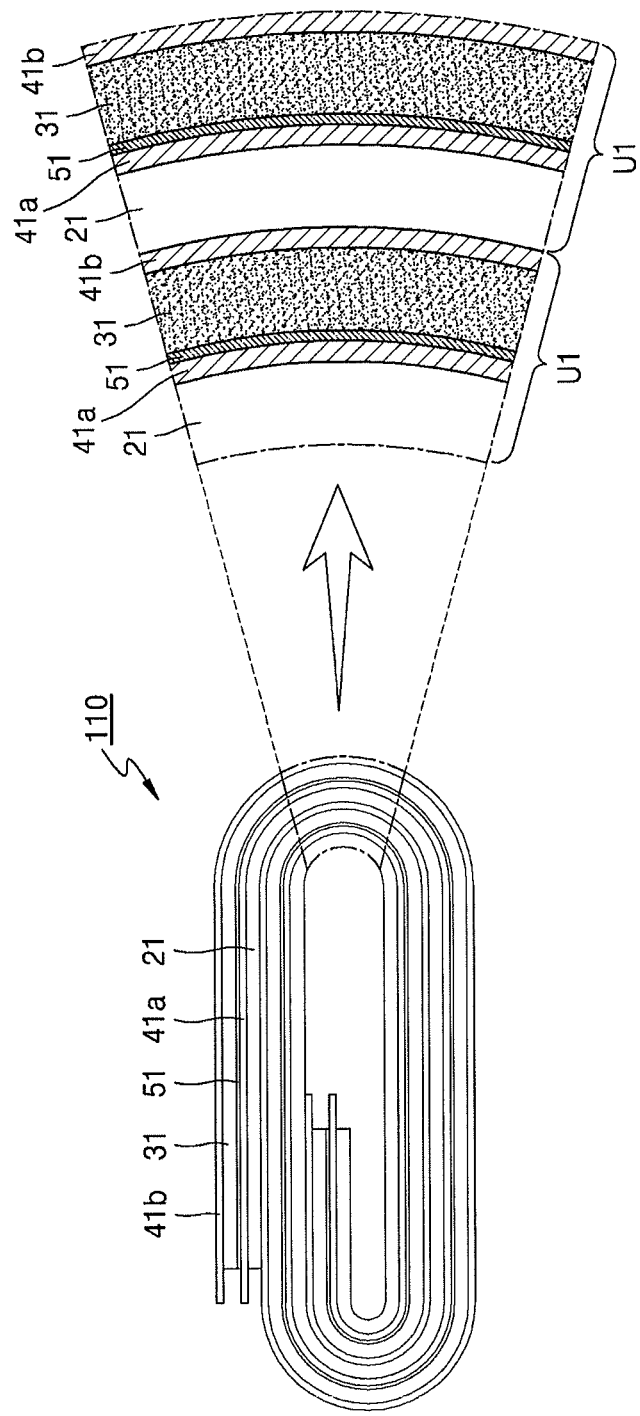
FIG. 2 illustrates an embodiment of an electrode assembly.

FIG. 2 illustrates an embodiment of a cross-section of the first electrode assembly 110 having a jelly-roll-type structure. The projection lines lead to enlarged view of a portion of the cross-sectional surface of the first electrode assembly 110.

Referring to FIG. 2, the first electrode assembly 110 includes a wound and stacked structure which includes a plurality of unit structures U1. Each unit structure U1 includes a sequence of the following: a first positive electrode 21, a first A-separator 41a, a first lithium ion conductor layer 51, a first negative electrode 31, and a first B-separator 41b. In order to avoid contact between the first positive electrode 21 and the first negative electrode 31 while the electrode assembly is wound, lengths of the first A-separator 41a and the first B-separator 41b may be longer than lengths of the first positive electrode 21 and the first negative electrode 31.

In another embodiment, when the first B-separator 41b is on an outer surface of the first positive electrode 21, the first electrode assembly 110 may include a wound and stacked structure which includes a sequence of: the first B-separator 41b, the first positive electrode 21, the first A-separator 41a, the first lithium ion conductor layer 51, and the first negative electrode 31.

In addition, the first lithium ion conductor layer 51 may be on an outer surface of first the positive electrode 21, between the first positive electrode 21 and the first A-separator 41a or between the first negative electrode 31 and the first B-separator 41b, instead of between the first A-separator 41a and the negative electrode 31 in FIG. 2. In another embodiment, the first lithium ion conductor layer 51 may be at least two of between the first A-separator 41a and the negative electrode 31, on an outer surface of the first positive electrode 21, between the first positive electrode 21 and the first A-separator 41a, or between the first negative electrode 31 and the first B-separator 41b.

The structure of the second electrode assembly 120 of a jelly-roll type may be the same as the first electrode assembly 110 in FIG. 2.

Figure 3:
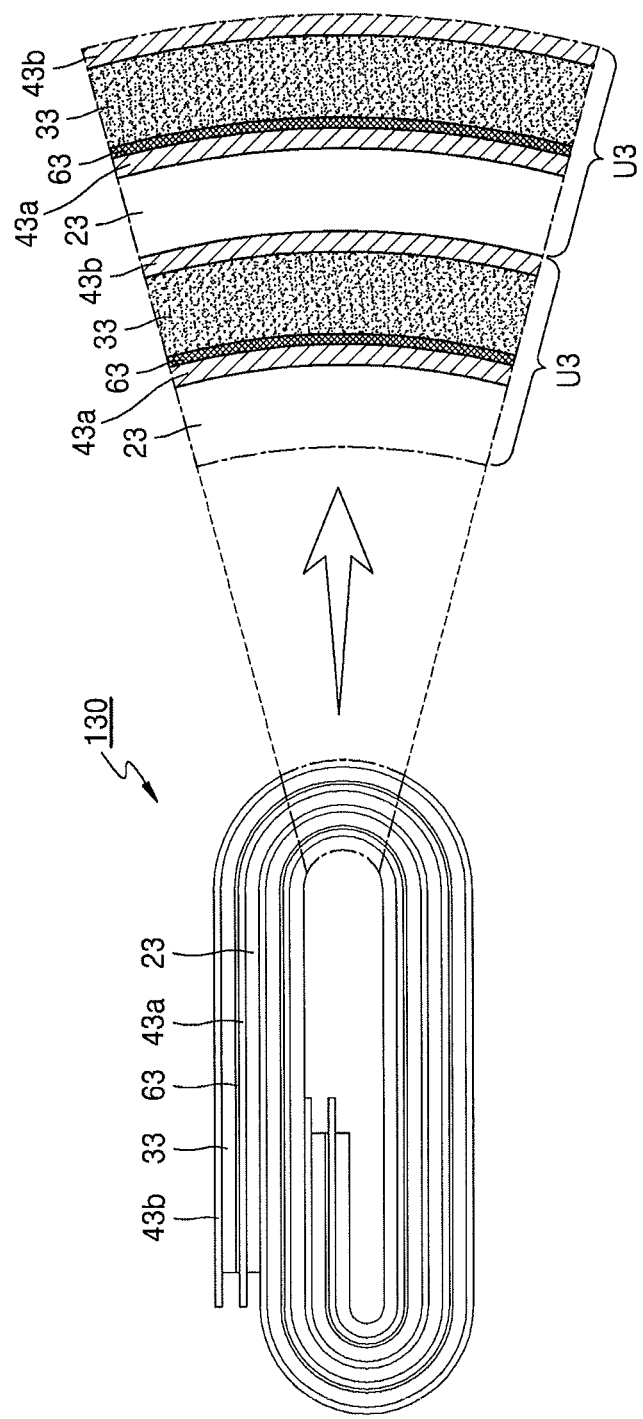
FIG. 3 illustrates an embodiment of another electrode assembly.

FIG. 3 illustrates an embodiment of a cross-section of the third electrode assembly 130 having a jelly-roll-type structure. The projection lines lead to an enlarged view of a portion of the third electrode assembly 130.

Referring to FIG. 3, the third electrode assembly 130 includes a plurality of unit structures U3. Each unit structure U3 is a stacked and wound structure which includes a sequence of the following: a third positive electrode 23, a third A-separator 43a, a ceramic layer 63, a third negative electrode 33, and a third B-separator 43b. In order to avoid contact between the third positive electrode 23 and the third negative electrode 33 while the electrode assembly is wound, lengths of the third A-separator 43a and the third B-separator 43b may be longer than lengths of the third positive electrode 23 and the third negative electrode 33.

In another embodiment, when the third B-separator 43b is on an outer surface of the third positive electrode 23, the third electrode assembly 130 may include a stacked and wound structure which includes a sequence of the following: the third B-separator 43b, the third positive electrode 23, the third A-separator 43a, the ceramic layer 63, and the third negative electrode 33.

In addition, the ceramic layer 63 may be between the third positive electrode 23 and the third A-separator 43a, instead of between the third A-separator 43a and the negative electrode 33 in FIG. 3, or may be both between the third positive electrode 23 and the third A-separator 43a and between the third A-separator 43a and the negative electrode 33.

In other embodiments, the first, second, and third electrode assemblies 110, 120, and 130 have a stack-type structure instead of a jelly-roll structure.

Figure 4:
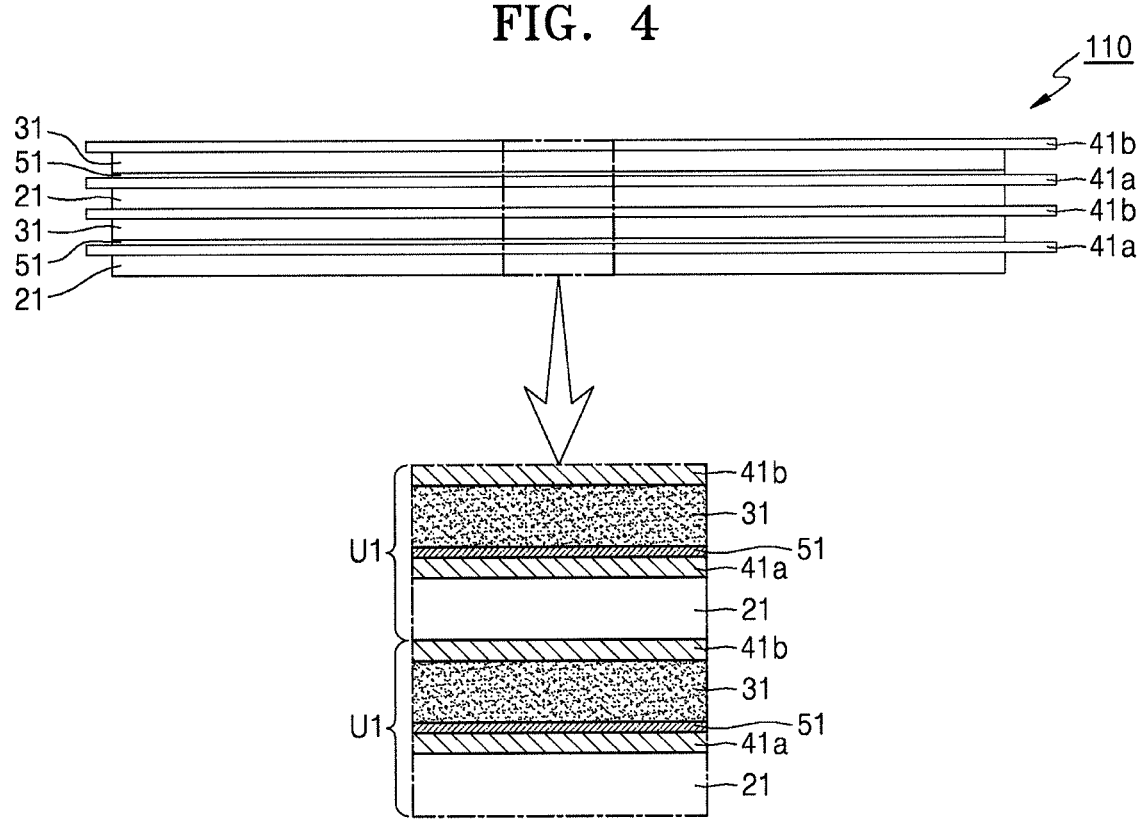
FIG. 4 illustrates an embodiment of another electrode assembly.

FIG. 4 illustrates an embodiment of a cross-section of the first electrode assembly 110 having a stack-type structure. The arrow points to an enlarged view of a portion of the first electrode assembly 110. Referring to FIG. 4, the first electrode assembly 110 includes has a stacked structure of a plurality of unit structures U1. Each unit structure includes a sequence of the following: a first positive electrode 21, a first A-separator 41a, a first lithium ion conductor layer 51, a first negative electrode 31, and a first B-separator 41b.

In another embodiment, when the first B-separator 41b is disposed on an outer surface of the first positive electrode 21, the first electrode assembly 110 may have a plurality of stacked unit structures, where each unit structure includes a sequence of the following: the first B-separator 41b, the first positive electrode 21, the first A-separator 41a, the first lithium ion conductor layer 51, and the first negative electrode 31.

Like the first electrode assembly 110 of a jelly-roll type, the first lithium ion conductor layer 51 of the first electrode assembly 110 of the stack type may be on an outer surface of first the positive electrode 21 between the first positive electrode 21 and the first A-separator 41a or between the first negative electrode 31 and the first B-separator 41b, instead of between the first A-separator 41a and the negative electrode 31 in FIG. 4.

In another embodiment, the first lithium ion conductor layer 51 may be in at least two of between the first A-separator 41a and the negative electrode 31, on an outer surface of the first positive electrode 21, between the first positive electrode 21 and the first A-separator 41a, and between the first negative electrode 31 and the first B-separator 41b.

The stack-type structure of the second electrode assembly 120 may be the same as the first electrode assembly 110 in FIG. 4.

Figure 5:
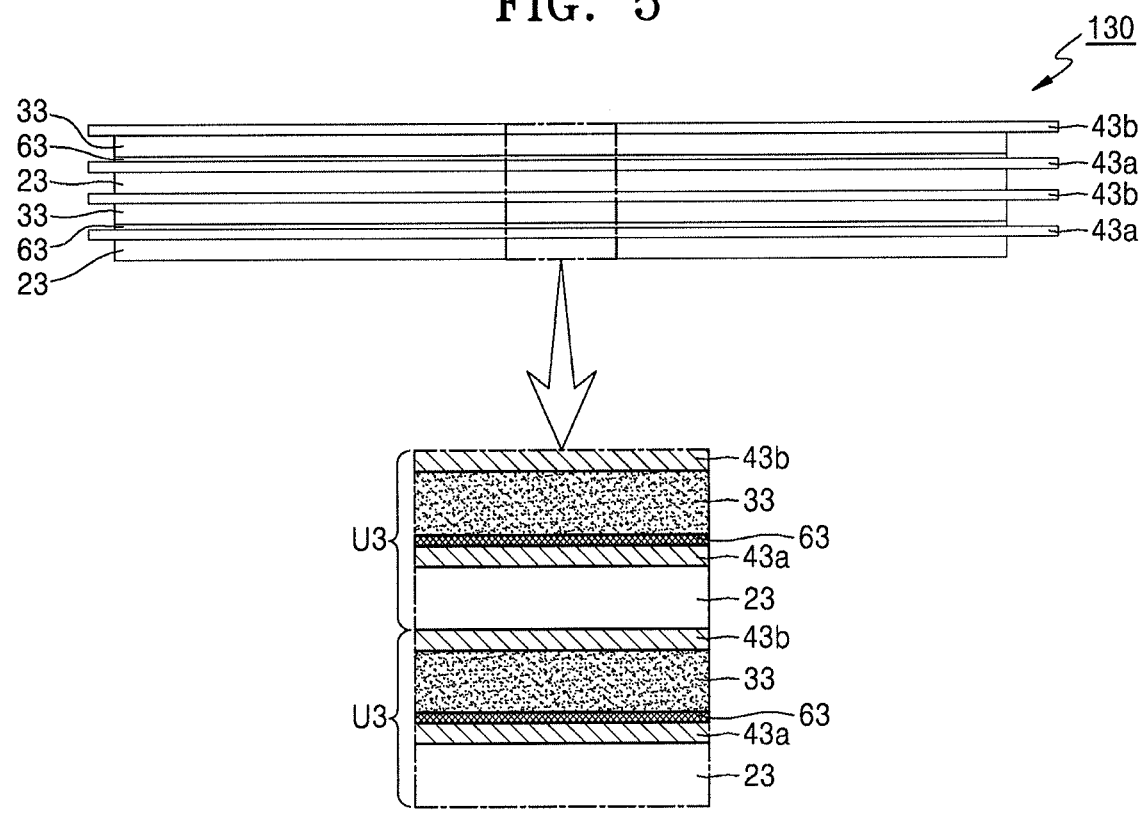
FIG. 5 illustrates an embodiment of another electrode assembly.

FIG. 5 illustrates an embodiment of a cross-section of the third electrode assembly 130 having a stack-type structure. The arrow points to an enlarged view of a portion of the third electrode assembly 130.

Referring to FIG. 5, the third electrode assembly 130 includes a stacked structure having a plurality of unit structures U3. Each unit structure U3 has a sequence of the following: a third positive electrode 23, a third A-separator 43a, a ceramic layer 63, a third negative electrode 33, and a third B-separator 43b.

In another embodiment, when the third B-separator 43b is on an outer surface of the third positive electrode 23, the third electrode assembly 130 may include a stacked structure of a plurality of unit structures. Each unit structure may include a sequence of the following: the third B-separator 43b, the third positive electrode 23, the third A-separator 43a, the ceramic layer 63, and the third negative electrode 33.

Like the third electrode assembly 130 of the jelly-roll type, the ceramic layer 63 of the third electrode assembly 130 of the stack type may be between the third positive electrode 23 and the third A-separator 43a, instead of between the third A-separator 43a and the negative electrode 33 in FIG. 5, or may be disposed both between the third positive electrode 23 and the third A-separator 43a and between the third A-separator 43a and the negative electrode 33.

In FIGS. 4 and 5, the stack-type electrode assembly may have a full cell (positive electrode/separator/negative electrode) structure or a bi-cell (positive electrode/separator/negative electrode/separator/positive electrode or negative electrode/separator/positive electrode/separator/negative electrode) structure.

In one embodiment, the first positive electrode may include a first positive electrode current collector and a first positive active material layer including a first positive active material. The first positive active material layer may be on at least one surface of the first positive electrode current collector. The second positive electrode may include a second positive electrode current collector and a second positive active material layer including a second positive active material. The second positive active material layer may be on at least one surface of the second positive electrode current collector. The third positive electrode may include a third positive electrode current collector and a third positive active material layer including a third positive active material. The third positive active material layer may be on at least one surface of the third positive electrode current collector.

The first positive active material, the second positive active material, and the third positive active material may be independently formed by any one of a variety of positive active materials. For example, the positive active material may be a compound represented by one of the following formulae: $Li_aA_{1-b}B_bD_2$ (where $0.90 \leq a \leq 1$, and $0 \leq b \leq 0.5$); $Li_aE_{1-b}B_bO_{2-c}D_c$ (where $0.90 \leq a \leq 1$, $0 \leq b \leq 0.5$, and $0 \leq c \leq 0.05$); $LiE_{2-b}B_bO_{4-c}D_c$ (where $0 \leq b \leq 0.5$, and $0 \leq c \leq 0.05$); $Li_aNi_{1-b-c}Co_bB_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB_cO_{2-\alpha}F_2$ (where $0.90 \leq a \leq 1$, $0 \leq b \leq 0.5$, $0 \leq c \leq 0.05$, and $0 < \alpha < 2$); $Li_aNi_{1-b-c}Mn_bB_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB_cO_{2-\alpha}F_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$; $Li_aNi_bCo_cMn_dG_eO_2$ (where $0.90 \leq a \leq 1$, $0 \leq b \leq 0.9$, $0 \leq c \leq 0.5$, $0 \leq d \leq 0.5$, and $0.001 \leq e \leq 0.1$; $Li_aNiG_bO_2$ (where $0.90 \leq a \leq 1$, and $0.001 \leq b \leq 0.1$; $Li_aCoG_bO_2$ (where $0.90 \leq a \leq 1$, and $0.001 \leq b \leq 0.1$; $Li_aMnG_bO_2$ (where $0.90 \leq a \leq 1$, and $0.001 \leq b \leq 0.1$; $Li_aMn_2G_bO_4$ (where $0.90 \leq a \leq 1$, and $0.001 \leq b \leq 0.1$; $QO_2$; $QS_2$; $LiQS_2$; $V_2O_5$; $LiV_2O_5$; $LiIO_2$; $LiNiVO_4$; $Li_{3-f}J_2(PO_4)_3$ (where $0 \leq f \leq 2$); $Li_{3-f}Fe_2(PO_4)_3$ (where $0 \leq f \leq 2$); and $LiFePO_4$.

In the above formulae, A is nickel (Ni), cobalt (Co), manganese (Mn), or a combination thereof; B is aluminum (Al), nickel (Ni), cobalt (Co), manganese (Mn), chromium (Cr), iron (Fe), magnesium (Mg), strontium (Sr), vanadium (V), a rare earth element, or a combination thereof; D is oxygen (O), fluorine (F), sulfur (S), phosphorus (P), or a combination thereof; E is cobalt (Co), manganese (Mn), or a combination thereof; F is fluorine (F), sulfur (S), phosphorus (P), or a combination thereof; G is aluminum (Al), chromium (Cr), manganese (Mn), iron (Fe), magnesium (Mg), lanthanum (LA, cerium (Ce), strontium (Sr), vanadium (V), or a combination thereof; Q is titanium (Ti), molybdenum (Mo), manganese (Mn), or a combination thereof; I is chromium (Cr), vanadium (V), iron (Fe), scandium (Sc), yttrium (Y), or a combination thereof; and J is vanadium (V), chromium (Cr), manganese (Mn), cobalt (Co), nickel (Ni), copper (Cu), or a combination thereof.

For example, the positive active material may be $LiCoO_2$, $LiMn_xO_{2x}$ where x=1, 2), $LiNi_{1-x}Mn_xO_2$, (where 0<x<1), $LiNi_{1-x-y}Co_xMn_yO_2$ (where 0≤x≤0.5, and 0≤y≤0.5), or $FePO_4$.

Each of the first positive active material and the second positive active material may independently include at least one of a lithium-nickel composite oxide represented by Formula 1, an olivine-based phosphoric acid compound represented by Formula 2, or a spinel-based lithium-manganese composite oxide represented by Formula 3.

Formula 1 is $Li_a(Ni_xMe_y)O_2$, where Me is at least one of cobalt (Co), manganese (Mn), iron (Fe), vanadium (V), copper (Cu), chromium (Cr), aluminum (Al), magnesium (Mg), or titanium (Ti), 0.9<a≤1.1, 0≤x<0.6, 0.4≤y≤1, and x+y=1. Me may be substituted or doped with at least one heterogeneous element of calcium (CA), magnesium, aluminum, titanium, strontium (Sr), iron, cobalt, nickel (Ni), copper, zinc (Zn), yttrium (Y), zirconium (Zr), niobium (NB), or boron (B).

Formula 2 is $LiMe'PO_4$, where Me' is at least one of Fe, Mn, Ni, Co, or V.

Formula 3 is $Li_{1+y}Mn_{2-y-x}M_zO_{4-x}Q_x$, where M is at least one of Mg, Al, Ni, Co, Fe, Cr, Cu, B, Ca, Nb, Mo, Sr, antimony (Sb), tungsten (W), Ti, V, Zr, or Zn. Q may be at least one of nitrogen (N), fluorine (F), sulfur (S), or chlorine (Cl), 0≤x≤1, 0≤y≤0.34, and 0≤z≤1.

When the lithium-nickel composite oxide has an amount of nickel within these ranges, a positive active material including the lithium-nickel composite oxide may have an excellent thermal stability compared to those having an amount of nickel out of these ranges. Further, since the olivine-based phosphoric acid compound has an olivine structure, the crystalline structure is very stable. Moreover, since phosphorous and oxygen are covalently bonded, oxygen is not released even at high temperatures, thereby promoting chemical safety. Also, the spinel-based lithium manganese oxide may have excellent thermal safety as a result of having a spinel structure of a cubic system. When these are used as positive active materials, battery safety may be improved.

In embodiments, the olivine-based phosphoric acid compound may include $LiFePO_4$ and the spinel-based lithium manganese oxide may include $LiMn_2O_4$.

In one embodiment, each of the first positive active material and the second positive active material may independently include a lithium-nickel composite oxide represented by Formula 1-1: $Li_a(Ni_xCo_yMn_z)O_2$. In Formula 1-1, 0.7<a≤1.3, 0≤x≤0.6, 0≤y≤0.4, 0≤z≤0.4, and x+y+z=1.

In one embodiment, the first positive active material and the second positive active material may include $LiNi_{1/3}Co_{1/3}Mn_{1/3}O_2$. In one embodiment, the first positive active material and the second positive active material may include $LiNi_{1/3}Co_{1/3}Mn_{1/3}O_2$.

In one embodiments, the third positive active material may include a lithium-nickel composite oxide represented by Formula 4: $Li_a(Ni_xM'_yM''_z)O_2$, where M' is at least one of Co, Mn, Ni, Al, Mg, or Ti. M'' is at least one of Ca, Mg, Al, Ti, Sr, Fe, Co, Ni, Cu, Zn, Y, Zr, Nb, or B, or a combination thereof, where 0.4<a≤1.3, 0.6≤x≤1, 0≤y≤0.4, 0≤z≤0.4, and x+y+z=1.

In one embodiment, the third positive active material may include a lithium-nickel composite oxide represented by Formula 5: $Li_a(Ni_xCo_yMn_z)O_2$, where 0.7<a≤1.3, 0.6≤x≤1, 0≤y≤0.4, 0≤z≤0.4, and x+y+z=1.

In one embodiment, the third positive active material may include $LiNi_{0.6}Co_{0.2}Mn_{0.2}O_2$, $LiNi_{0.7}Co_{0.2}Mn_{0.1}O_2$, or $LiNi_{0.8}Co_{0.1}Mn_{0.1}O_2$. In one embodiment, the third positive active material may be $LiNi_{0.6}Co_{0.2}Mn_{0.2}O_2$, $LiNi_{0.7}Co_{0.2}Mn_{0.1}O_2$, or $LiNi_{0.8}Co_{0.1}Mn_{0.1}O_2$.

The amount of nickel in a lithium-nickel composite oxide as the third positive active material may be more than the amount of nickel in a lithium-nickel composite oxide as the first and second positive active materials.

When the third positive active material includes a lithium-nickel composite oxide having an amount of nickel more than the first and second positive active materials, an electrode assembly having high-capacity and energy density may be manufactured. Therefore, by changing the composition of the first and second positive active materials from the composition of the third positive active material, a secondary battery having a high energy density and thermal safety may be provided.

In one embodiment, the first negative electrode may include a first negative electrode current collector and a first negative active material layer including a first negative active material. The first negative active material layer may be on at least one surface of the first negative electrode current collector. The second negative electrode may include a second negative electrode current collector and a second negative active material layer including a second negative active material. The second negative active material layer may be on at least one surface of the second negative electrode current collector. The third negative electrode may include a third negative electrode current collector and a third negative active material layer including a third negative active material. The third negative active material layer may be on at least one surface of the third negative electrode current collector.

In one embodiment, each of the first negative active material, the second negative active material, and the third negative active material may be independently formed to include any of a variety of negative active materials. For example, the first negative active material may include at least one of a lithium metal, a metal which forms an alloy with lithium, a transition metal oxide, a non-transition metal oxide, or a carbon material.

Examples of metals that may form an alloy with lithium include Si, Sn, Al, Ge, Pb, Bi, Sb, a Si—Y alloy (where Y may be an alkali metal, an alkali earth metal, a Group 13 and 14 element, a transition metal, a rare earth element, or combinations thereof except for Si), and a Sn—Y alloy (where Y is an alkali metal, an alkali earth metal, a Group 13 and 14 element, a transition metal, a rare earth element, or combinations thereof except for Sn). Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

The transition metal oxide may be, for example, a lithium titanium oxide, a vanadium oxide, or a lithium vanadium oxide. The non-transition metal oxide may be, for example, $SnO_2$ or $SiO_x$ (where 0<x<2).

The carbonaceous material may be, for example, crystalline carbon, amorphous carbon, or combinations thereof.

Examples of the crystalline carbon include shapeless, disk-shaped, flake, globular, or fibrous natural graphite and artificial graphite. Examples of the amorphous carbon include soft carbon, hard carbon, meso-phase pitch carbides, and calcined corks.

In one embodiment, the thickness of the first positive electrode current collector and/or the thickness of the second positive electrode current collector may be about 1 to about 2 times greater than a thickness of the third positive electrode current collector. The thickness of the first negative electrode current collector and/or the thickness of the second negative electrode current collector may be about 1 to about 2 times greater than the thickness of the third negative electrode current collector.

For example, the thickness of the first positive electrode current collector and the thickness of the second positive electrode current collector may be greater than but less than or equal to about 2 times the thickness of the third positive electrode current collector. The thickness of the first negative electrode current collector and a thickness of the second negative electrode current collector may be greater than but less than or equal to about 2 times a thickness of the third negative electrode current collector.

When the thickness of the first and second positive electrode current collectors and the thickness of the first and second negative electrode current collectors are within these ranges and are formed to be greater than those of the third positive electrode current collector and the third negative electrode current collector, heat release and the effects of current dispersion may be improved. Furthermore, when thicknesses of the third positive electrode current collector and the third negative electrode current collector are within these ranges, an area that other components may occupy increases, compared to the first and second electrode assemblies, thereby increasing the capacity per unit volume of a battery.

The first positive electrode current collector, the second positive electrode current collector, and the third positive electrode current collector, and the first negative electrode current collector, the second negative electrode current collector, and the third negative electrode current collector may be any material that has conductivity and does not cause chemical changes in a battery.

For example, the first positive electrode current collector, the second positive electrode current collector, and the third positive electrode current collector, and the first negative electrode current collector, the second negative electrode current collector, and the third negative electrode current collector may be formed of at least one of aluminum, copper, nickel, titanium, or stainless steel. A material such as aluminum, copper, nickel, or stainless steel may be surface-treated by electroplating or ion deposition using a coating component, such as nickel, copper, aluminum, titanium, gold, silver, platinum, or palladium. In one embodiment, the surface of the material may be coated with nanoparticles of the coating component by dipping or pressing.

In one embodiment, the current collector may include a base formed of a non-conductive material and coated with a conductive material as described above. The current collector may have a surface having a fine uneven structure. The fine uneven structure may contribute to an increase in adhesiveness to an active material layer that is used to coat a substrate. The current collector may be formed, for example, as a film, a sheet, a foil, a net, a porous structure, a foam, or a non-woven fabric. The thickness of the current collector may be in a range of about 3 µm to about 500 µm.

In one embodiment, the thickness of the first A-separator and/or the second A-separator may be about 1 to about 2 times greater than that of the third A-separator. For example, the thickness of the first A-separator and/or the second A-separator may be greater than but less than or equal to about 2 times that of the third A-separator.

The first A and B-separators, the second A and B-separators, and the third A and B-separators may be any separator that is commonly used in a lithium secondary battery. For example, the separator 24 may have low resistance to migration of ions in an electrolyte and electrolytic solution-retaining ability. Examples of the separator include glass fiber, polyester, Teflon, polyethylene, polypropylene, polytetrafluoroethylene (PTFE), and a combination thereof, each of which may be a nonwoven fabric or a woven fabric. The separator may have a pore diameter, for example, of about 0.01 µm to about 10 µm. The thickness of the separator may be, for example, in a range of about 5 µm to about 300 µm. Within these ranges, any decrease in capacity per unit volume may be reduced or prevented. Also, safety from an internal short may be achieved. The thickness of the separator may be, for example, in a range of about 8 µm to about 30 µm.

In one embodiment, each of the first lithium ion conductor layer and the second lithium ion conductor layer may include a ceramic-based lithium ion conductor or a polymer-based lithium ion conductor. Each of the first lithium ion conductor layer and the second lithium ion conductor layer may include, for example, a ceramic-based lithium ion conductor, e.g., a sulfide-based lithium ion conductor. For example, each of the first lithium ion conductor layer and the second lithium ion conductor layer may include at least one sulfide-based lithium ion conductor, e.g., at least one of a lithium superionic conductor (LISICON), a Garnet lithium ion conductor, a Perovskite lithium ion conductor, a lithium phosphorus oxinitride (LIPON) lithium ion conductor, a Na superionic conductor (NASICON), or a combination thereof.

In one embodiment, the first lithium ion conductor layer and the second lithium ion conductor layer may include a LISICON. Examples of LISICON include $Li_2S$—$P_2S_5$, $Li_2S$—$SiS_2$, $Li_2S$—$SiS_2$—$P_2S_5$, $Li_2S$—$GeS_2$, $Li_2O$—$Al_2O_3$—$SiO_2$—$P_2O_5$—$TiO_2$, $Li_2O$—$Al_2O_3$—$SiO_2$—$P_2O_5$—$TiO_2$—$GeO_2$, or $Li_3PO_4$—$Li_2S$—$SiS_2$. In one particular embodiment, $Li_2O$—$Al_2O_3$—$SiO_2$—$P_2O_5$—$TiO_2$—$GeO_2$ may be used.

The first lithium ion conductor layer and the second lithium ion conductor layer may be a film including a lithium ion conductor. In one embodiment, the first lithium ion conductor layer and the second lithium ion conductor layer may be formed by coating a positive electrode or negative electrode with a lithium ion conductor. The coating may be performed, for example, by coating and drying via sol-gel treatment, sputtering, spin coating, chemical vapor deposition (CVD), or pulse laser deposition (PLD).

The thickness of the first lithium ion conductor layer and a thickness of the second lithium ion conductor layer may be in a range of, for example, about 5 nm to about 500 µm. Within this range, the first lithium ion conductor layer and the second lithium ion conductor layer may have sufficient mechanical strength to prevent a short due to formation of lithium dendrites. Also, areas for other components may be secured. Thus, a certain degree of capacity of a battery per unit volume may be achieved. Each of the lithium ion conductor layers may have, for example, a thickness of about 1 µm to about 50 µm, and in some embodiments a thickness of about 10 µm to about 30 µm.

When any of the electrode assemblies according to the above-described embodiments include a plurality of lithium ion conductor layers, materials and thicknesses of these lithium ion conductor layers may be the same or different.

The ceramic layer may include an inorganic material and a binder. The inorganic material may be, for example, a metal oxide, a metalloid oxide, a metal fluoride, a metal hydroxide, and a combination thereof. Examples of the inorganic material include $Al_2O_3$, $SiO_2$, $TiO_2$, $SnO_2$, $CeO_2$, MgO, NiO, CaO, ZnO, $ZrO_2$, $Y_2O_3$, $SrTiO_3$, $BaTiO_3$, $Mg(OH)_2$, MgF, and a combination thereof.

Examples of the binder include polyvinylidene fluoride-co-hexafluoropropylene, polyvinylidene fluoride-co-trichloroethylene, polymethyl methacrylate, polyacrylonitrile, polyvinylpyrrolidone, polyvinyl acetate, polyethylene-co-vinyl acetate, polyimide, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxyl methyl cellulose, polyvinyl alcohol, and a combination thereof.

The ceramic layer may be bonded to at least one surface of the third A-separator. For example, the ceramic layer may be formed on at least one surface of the third A-separator. When the ceramic layer is bonded to at least one surface of the third A-separator, the ceramic layer may prevent expansion of a short due to an excellent heat resistance of the ceramic layer, even when an internal temperature of a battery increases over 100° C. due to an internal short.

In one embodiment, the ceramic layer may be bonded to a surface adjacent to the third A-separator of the third positive electrode or the third negative electrode. In one embodiment, the ceramic layer may be formed on a surface adjacent to the third A-separator of the third positive electrode or the third negative electrode.

In one embodiment, the weight ratio of an inorganic material to a binder in the ceramic layer may be in a range of, for example, about 80 to 20 to about 50 to 50. For example, the ceramic layer may be formed by coating at least one of the third A-separator, the third positive electrode, or the third negative electrode with a mixture. The mixture may be formed, for example, by mixing a mixture of an inorganic material and a binder at a weight ratio of about 80 to 20 to about 50 to 50 with a solvent, such as N-methyl pyrrolidone (NMP), water, toluene, or xylene.

The formed ceramic layer may have a thickness in a range of, for example, about 50 nm to about 20 μm.

A method for manufacturing the lithium battery, and particularly the first, second, and third electrode assemblies 110, 120, and 130 is described as follows. The positive electrodes of the first, second, and third electrode assemblies may be manufactured, for example, by mixing a positive active material, a binder, and optionally a conductor, in a solvent to prepare a positive active material composition. This composition may then be molded into a certain shape, spread on a current collector such as aluminum, or formed as a positive active material layer on at least one surface of a current collector.

The binder used in the composition for a positive active material is a component that facilitates bonding of the positive active material to the conductor and bonding of the positive active material to the current collector. The binder may be added, for example, in an amount of about 1 part by weight to about 50 parts by weight based on 100 parts by weight of the positive active material. For example, the binder may be added in an amount of 1 part by weight to about 30 parts by weight, about 1 part by weight to about 20 parts by weight, or about 1 part by weight to about 15 parts by weight based on 100 parts by weight of the positive active material.

Examples of the binder include polyvinylidene fluoride (PVDF), polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polystyrene, polymethyl methacrylate, polyaniline, acrylonitrile butadiene styrene, phenol resin, epoxy resin, polyethylene terephthalate, polytetrafluoroethylene, polyphenyl sulfide, polyamide-imide, polyetherimide, polyethylene sulfone, polyamide, polyacetal, polyphenylene oxide, polybutylene terephthalate, ethylene-propylene-diene monomer (EPDM), sulfonated EPDM, styrene-butadiene-rubber (SBR), fluorinated rubber, or a combination thereof, but embodiments are not limited thereto.

The positive electrode provides a conductive pathway to the positive active material, and may optionally include a conductor for improving electrical conductivity of the positive electrode. Examples of the conductor include a carbonaceous material, such as carbon black, acetylene black, Ketjen black, and carbon fiber; a metal-based material, such as copper, nickel, aluminum, and silver, each of which may be used in powder or fiber form; a conductive polymer, such as a polyphenylene derivative; and a mixture thereof. The amount of the conductor may be appropriately controlled. For example, a weight ratio of the positive active material to the conductor may be in a range of about 99:1 to about 90:10.

Examples of the solvent include, but are not limited to, N-methylpyrrolidone (NMP), acetone, or water. The amount of solvent may be in a range of, for example, about 1 part to about 40 parts by weight based on 100 parts by weight of the total weight of the positive active material. When the amount of solvent is within this range, the process for forming the active material layer may be more easily carried out.

The negative electrodes of the first, second, and third electrode assemblies may be manufactured in the same manner used to manufacture the positive electrodes, except that a negative active material is used instead of a positive active material. The same binder, conductor, and solvent used to manufacture the positive electrode may be used to prepare a negative active material composition.

Then, a unit structure may be wound or stacked to form a jelly-roll type or a stack type electrode assembly. The unit structure may include the following in sequence: the manufactured positive electrode (or a positive electrode on which a ceramic layer is formed) and negative electrode (or a negative electrode on which a ceramic layer is formed), the separator (or a separator on which a ceramic layer is formed), and a lithium ion conductor layer.

Thereafter, the first electrode assembly 110 and the second electrode assembly 120 may be disposed to be adjacent to a case having, for example, a rectangular form or a cylindrical form. Then, the third electrode assembly 130 may be disposed between the first electrode assembly 110 and the second electrode assembly 120. Then, an electrolyte (E) may be injected into the case to form the lithium battery.

The electrolyte may include a non-aqueous electrolyte and a lithium salt. Examples of the non-aqueous electrolyte include a non-aqueous electrolyte solution, and an organic solid electrolyte. Examples of the non-aqueous electrolyte solution include an aprotic organic solvent, such as N-methyl-2-pyrrolidinone, propylene carbonate (PC), ethylene carbonate (EC), butylene carbonate, dimethyl carbonate (DMC), diethyl carbonate (DEC), ethyl methyl carbonate (EMC), gamma-butyrolactone (GBL), 1,2-dimethoxy ethane (DME), tetrahydrofuran (THF), 2-methyl tetrahydrofuran, domethyl sulfoxide (DMSO), 1,3-dioxolane (DOL), formamide, dimethyl formamide, acetonitrile, nitromethane, methyl formate, methyl acetate, triester phosphate, trimethoxymethane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

Examples of the organic solid electrolyte may include a polyethylene derivative, a polyethylene oxide derivative, a polypropylene oxide derivative, a phosphate ester polymer, a poly agitation lysine, a polyester sulfide, a polyvinyl alcohol, a polyvinylidene fluoride, and a polymer including an ionic dissociation group.

The lithium salt may be any one of a variety of lithium salt that dissolves in the non-aqueous electrolyte. Examples of the lithium salt include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, C$_4$F$_9$SO$_3$Li, (CF$_3$SO$_2$)$_2$NLi, lithium chloroborate, a lower aliphatic lithium carboxylic acid, lithium tetraphenyl borate, and imide.

Further, vinylene carbonate (VC) or catechol carbonate (CC) may be included in the electrolyte solution to form and maintain an SEI layer on a surface of the negative electrode. Optionally, the electrolyte may include a redox-shuttle type additive, such as n-butylferrocene or halogen-substituted benzene, to prevent overcharging of a battery. Optionally, the electrolyte may include an additive, such as cyclohexyl benzene or biphenyl, for forming a coating film. Optionally, the electrolyte may include a cation receptor, such as a crown ether-based compound, or an anion receptor, such as a boron-based compound, to improve conductivity characteristics of the electrolyte. Optionally, the electrolyte may include a phosphate-based compound, such as trimethylphosphate (TMP), tris (2,2,2-trifluoroethyl)phosphate (TFP), or hexamethoxycyclotriphosphazene (HMTP), as a flame retardant.

The electrolyte may include an additive such as tris (trimethylsilyl) phosphate (TMSPa), lithium difluorooxalatoborate (LiFOB), propane sultone (PS), succinonitrile (SN), LiBF$_4$, a silane compound having a functional group that may form a siloxane bond with, for example, acryl, amino, epoxy, methoxy, ethoxy, or vinyl, and a silazane compound such as hexamethyldisilazane to aid formation of a stable SEI layer or a coating film on a surface of the electrode and thus to improve stability of a battery. Examples of the additive include PS, succinonitrile (SN), and LiBF$_4$.

For example, a lithium salt such as LiPF$_6$, LiClO$_4$, LiBF$_4$, or LiN(SO$_2$CF$_3$)$_2$ may be added to a mixture solvent including a high dielectric solvent, which is a cyclic carbonate such as EC or PC, and a low viscosity solvent, which is a linear carbonate such as DEC, DMC, or EMC to prepare an electrolyte.

In one embodiment, multiple (e.g., two or more) electrode assemblies are placed inside the case.

Figure 6:
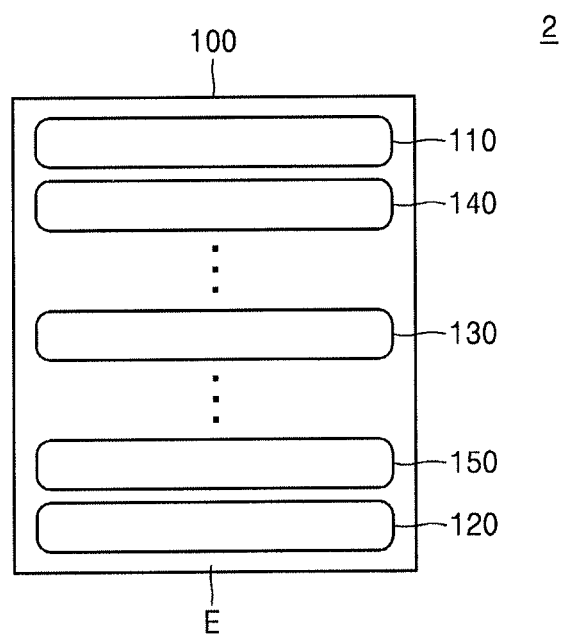
FIG. 6 illustrates another embodiment of a lithium battery.

FIG. 6 illustrates another embodiment of a lithium battery 2 which includes the first electrode assembly 110 and the second electrode assembly 120 adjacent to the case 100 and a plurality of the third electrode assemblies 130, 140, and 150 between the first electrode assembly 110 and the second electrode assembly 120. The third electrode assemblies 130, 140, and 150 between the first electrode assembly 110 and the second electrode assembly 120 may be identical to or different from one another. The lithium battery may be a lithium secondary battery.

The following Examples and Comparative Examples are provided in order to highlight characteristics of one or more embodiments. However, the Examples and Comparative Examples are not to be construed as limiting the scope of the claims, nor are the Comparative Examples to be construed as necessarily being outside the scope of the embodiments. Further, it will be understood that the embodiments are not limited to the particular details described in the Examples and Comparative Examples.

Example 1

The first electrode assembly was formed as follows.
1) Manufacture of the Positive Electrode
94 wt % of LiNi$_{1/3}$Co$_{1/3}$Mn$_{1/3}$O$_2$ as a positive active material, 3 wt % of Super P carbon black as a conductor, and 3 wt % of polyvinylidene fluoride (PVdF) as a binder were mixed in N-methylpyrrolidone (NMP) as a solvent to prepare a positive active material composition. The positive active material composition was coated on an aluminum current collector having a thickness of 15 μm by using a common method, dried and then pressed to manufacture a positive electrode.

2) Manufacture of the Negative Electrode
96 wt % of natural graphite as a negative active material, and 4 wt % of PVdF as a binder were mixed in N-methylpyrrolidone as a solvent to prepare a negative active material composition. The negative active material composition was coated on a copper current collector having a thickness of 8 μm by using a common method, dried and then pressed to manufacture a negative electrode.

3) Manufacture of the First Electrode Assembly
A separator including polyethylene (PE) film (available from SKI Co., Ltd) and Li$_2$O—Al$_2$O$_3$—SiO$_2$—P$_2$O$_5$—TiO$_2$—GeO$_2$ (a lithium superionic conductor (LISICON), available from Ohara Co., Ltd) having a thickness of about 150 μm as a lithium ion conductor layer was prepared. Then, the positive electrode manufactured above, the separator, the lithium ion conductor layer, the negative electrode manufactured above, and another separator were sequentially stacked upon one another, and then wound to manufacture a jelly-roll type electrode assembly.

The second electrode assembly was formed in the same manner as the first electrode assembly.

The third electrode assembly was formed as follows.
1) Manufacture of the Positive Electrode
A positive electrode was manufactured in the same manner as the positive electrode of the first electrode assembly, except that LiNi$_{0.6}$CO$_{0.2}$Mn$_{0.2}$O$_2$ was used instead of LiNi$_{1/3}$Co$_{1/3}$Mn$_{1/3}$O$_2$ as a positive active material.

2) Manufacture of the Negative Electrode
96 wt % of alumina (Al$_2$O$_3$, available from Sumitomo Co., Ltd) as minerals, and 4 wt % of BM520B (available from Zeon Co. Ltd) as a binder were mixed in N-methylpyrrolidone as a solvent to prepare a ceramic layer composition. The manufactured negative electrode for the first electrode assembly, was coated with the prepared ceramic layer composition by using a common method for preparing a negative electrode having a formed ceramic layer having a thickness of about 10 μm.

3) Manufacture of the Third Electrode Assembly
The positive electrode manufactured above, a PE separator, the negative electrode having a formed ceramic layer manufactured above, and a PE separator were sequentially stacked upon one another, and then wound to manufacture a jelly-roll type electrode assembly.

The lithium battery was formed as follows.

The first electrode assembly and the second electrode assembly were disposed adjacent to inside surfaces of a rectangular case. The third electrode assembly was encased in the rectangular case. Then, an electrolyte of 1.3 M $LiPF_6$ lithium salt in a mixed solvent of ethylene carbonate (EC), ethyl methyl carbonate (EMC), and dimethyl carbonate (DMC) at a ratio of 1:1:1 by volume was injected into the rectangular case, thereby manufacturing a lithium secondary battery.

Example 2

The first and second electrode assemblies were formed in the same manner as Example 1. The third electrode assembly was formed as follows.

1) Manufacture of the Positive Electrode

The positive electrode was manufactured in the same manner as the positive electrode of the third electrode assembly in Example 1.

2) Manufacture of the Negative Electrode

The negative electrode was manufactured in the same manner as the negative electrode of the first electrode assembly in Example 1.

3) Manufacture of the Third A-Separator 96 wt % of alumina ($Al_2O_3$, available from Sumitomo Co., Ltd) as minerals, and 4 wt % of polymetheylmethacrylate (PMMA, available from Zeon Co. Ltd) as a binder were mixed in N-methylpyrrolidone as a solvent to prepare a ceramic layer composition. The PE separator was coated with the prepared ceramic layer composition by using a method that is commonly used in the art to manufacture a third A-separator having a formed ceramic layer in which the ceramic layer had a thickness of about 10 μm.

In forming the third electrode assembly, the positive electrode manufactured above, the third A-separator having the formed ceramic layer, the negative electrode manufactured above, and a PE separator were sequentially stacked upon one another, and then wound to manufacture a jelly-roll type electrode assembly. The lithium battery was manufactured in the same manner as Example 1, except that the third electrode assembly manufactured in Example 2 was used instead of the third electrode assembly manufactured in Example 1.

Example 3

In this example, the lithium battery was manufactured in the same manner as Example 1, except that $LiNi_{0.7}Co_{0.2}Mn_{0.1}O_2$ was used instead of $LiNi_{0.6}Co_{0.2}Mn_{0.2}O_2$ as a positive active material of a third electrode assembly.

Example 4

A lithium battery was manufactured in the same manner as Example 2, except that $LiNi_{0.7}Co_{0.2}Mn_{0.1}O_2$ was used instead of $LiNi_{0.6}Co_{0.2}Mn_{0.2}O_2$ as a positive active material of a third electrode assembly.

Comparative Example 1

A lithium battery was manufactured in the same manner as Example 2, except that a lithium ion conductor layer was not used in negative electrodes of first and second electrode assemblies. Also, a PE separator was used instead of the third A-separator having a formed ceramic layer when manufacturing a third electrode assembly.

Comparative Example 2

A lithium battery was manufactured in the same manner as Example 2, except that a lithium ion conductor layer was not used in negative electrodes of first and second electrode assemblies.

Comparative Example 3

A lithium battery was manufactured in the same manner as Example 2, except that a PE separator was used instead of the third A-separator having a formed ceramic layer when manufacturing a third electrode assembly.

Comparative Example 4

A lithium battery was manufactured in the same manner as Example 4, except that a PE separator was used instead of the third A-separator having a formed ceramic layer when manufacturing a third electrode assembly.

Comparative Example 5

A lithium battery was manufactured in the same manner as Example 4, except that two third electrode assemblies were manufactured and disposed adjacent to internal surfaces of a case, and a first electrode assembly was disposed between the third electrode assemblies.

Evaluation Example 1

Penetration Test and Compression Test

Penetration and compression tests were performed on the lithium secondary batteries of Examples 1 to 4 and Comparative Examples 1 to 5 as follows. (The results are shown in Table 1).

The penetration test is a simulation of an internal short in a lithium secondary battery caused by an internal or external impact. After the lithium secondary batteries were subjected to charging in a standard condition (at 0.5 C to 4.2 V, and 0.05 C (cut-off)) and then rested for about 10 minutes or longer (up to 72 hours), each lithium secondary battery was completely penetrated through the middle with a nail (a 3 mm diameter) at a rate of about 60 mm/sec. Each of the lithium secondary batteries maintained until a surface temperature thereof reached about 40° C. or less.

The compression test was performed to measure battery safety when the battery was compressed by a waste crusher during simulation of an internal short in the battery caused by external pressure. After the lithium secondary batteries were subjected to charging in a standard condition (at 0.5 C to 4.2 V, and 0.05 C (cut-off)) and then rested for about 10 minutes or longer (up to 72 hours), each lithium secondary battery was compressed with a force of about 13 kN in a direction parallel to the lengthwise direction of the lithium secondary battery and then released from the force in one second. Each battery maintained until a surface temperature reached about 40° C. or less.

TABLE 1

| | The first electrode assembly | The third electrode assembly | The second electrode assembly | P test result | C test result |
|---|---|---|---|---|---|
| Example 1 | 1) including LISICON 2) positive active material- $LiNi_{1/3}Co_{1/3}Mn_{1/3}O_2$ | 1) including a negative electrode formed a ceramic layer 2) positive active material- $LiNi_{0.6}Co_{0.2}Mn_{0.2}O_2$ | 1) including LISICON 2) positive active material- $LiNi_{1/3}Co_{1/3}Mn_{1/3}O_2$ | L2 | Pass |
| Example 2 | 1) including LISICON 2) positive active material- $LiNi_{1/3}Co_{1/3}Mn_{1/3}O_2$ | 1) including a separator formed a ceramic layer 2) positive active material- $LiNi_{0.6}Co_{0.2}Mn_{0.2}O_2$ | 1) including LISICON 2) positive active material- $LiNi_{1/3}Co_{1/3}Mn_{1/3}O_2$ | L2 | Pass |
| Example 3 | 1) including LISICON 2) positive active material- $LiNi_{1/3}Co_{1/3}Mn_{1/3}O_2$ | 1) including a negative electrode formed a ceramic layer 2) positive active material- $LiNi_{0.7}Co_{0.2}Mn_{0.1}O_2$ | 1) including LISICON 2) positive active material- $LiNi_{1/3}Co_{1/3}Mn_{1/3}O_2$ | L3 | Pass |
| Example 4 | 1) including LISICON 2) positive active material- $LiNi_{1/3}Co_{1/3}Mn_{1/3}O_2$ | 1) including a separator formed a ceramic layer 2) positive active material- $LiNi_{0.7}Co_{0.2}Mn_{0.1}O_2$ | 1) including LISICON 2) positive active material- $LiNi_{1/3}Co_{1/3}Mn_{1/3}O_2$ | L3 | Pass |
| Comparative Example 1 | 1) not including LISICON 2) positive active material- $LiNi_{1/3}Co_{1/3}Mn_{1/3}O_2$ | 1) not including a separator formed a ceramic layer 2) positive active material- $LiNi_{0.6}Co_{0.2}Mn_{0.2}O_2$ | 1) not including LISICON 2) positive active material- $LiNi_{1/3}Co_{1/3}Mn_{1/3}O_2$ | L5 | Fail |
| Comparative Example 2 | 1) not including LISICON 2) positive active material- $LiNi_{1/3}Co_{1/3}Mn_{1/3}O_2$ | 1) including a separator formed a ceramic layer 2) positive active material- $LiNi_{0.6}Co_{0.2}Mn_{0.2}O_2$ | 1) not including LISICON 2) positive active material- $LiNi_{1/3}Co_{1/3}Mn_{1/3}O_2$ | L5 | Fail |
| Comparative Example 3 | 1) including LISICON 2) positive active material- $LiNi_{1/3}Co_{1/3}Mn_{1/3}O_2$ | 1) not including a separator formed a ceramic layer 2) positive active material- $LiNi_{0.6}Co_{0.2}Mn_{0.2}O_2$ | 1) including LISICON 2) positive active material- $LiNi_{1/3}Co_{1/3}Mn_{1/3}O_2$ | L4 | Pass |
| Comparative Example 4 | 1) including LISICON 2) positive active material- $LiNi_{1/3}Co_{1/3}Mn_{1/3}O_2$ | 1) not including a separator formed a ceramic layer 2) positive active material- $LiNi_{0.7}Co_{0.2}Mn_{0.1}O_2$ | 1) including LISICON 2) positive active material- $LiNi_{1/3}Co_{1/3}Mn_{1/3}O_2$ | L5 | Fail |
| Comparative Example 5 | 1) including a separator having a formed ceramic layer 2) positive active material- $LiNi_{0.6}Co_{0.2}Mn_{0.2}O_2$ | 1) including LISICON 2) positive active material- $LiNi_{1/3}Co_{1/3}Mn_{1/3}O_2$ | 1) including a separator having a formed ceramic layer 2) positive active material- $LiNi_{0.6}Co_{0.2}Mn_{0.2}O_2$ | L4 | Pass |

(*L1: Leakage, L2: heat less than 200° C., L3: heat 200° C. or more, L4: ignition, and L5: explosion). The notation P Test corresponds to the penetration test and the notation C test corresponds to the compression test.

Referring to Table 1, in the lithium batteries of Examples 1 to 4, first and second electrode assemblies including lithium ion conductor layers were disposed adjacent to the case, and the third electrode assembly including the ceramic layer was disposed between the first electrode assembly and the second electrode assembly. These Examples 1 to 4 were found to have excellent thermal stability compared to the lithium batteries of Comparative Examples 1 to 5.

In accordance with one or more of the aforementioned embodiments, a lithium battery has an electrode assembly which includes a ceramic layer. The electrode assembly is between electrode assemblies including lithium ion conductor layers to prevent internal short and improve safety.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A lithium battery, comprising:
    a case;
    a first electrode assembly including a first positive electrode, a first negative electrode, a first A-separator between the first positive electrode and the first negative electrode, and a first lithium ion conductor layer which is at least one of on an outer surface of the first positive electrode, between the first positive electrode and the first A-separator, between the first A-separator and the first negative electrode, and on an outer surface of the first negative electrode;

a second electrode assembly including a second positive electrode, a second negative electrode, a second A-separator between the second positive electrode and the second negative electrode, and a second lithium ion conductor layer which is at least one of on an outer surface of the second positive electrode, between the second positive electrode and the second A-separator, between the second A-separator and the second negative electrode, and on an outer surface of the second negative electrode; and a third electrode assembly including a third positive electrode, a third negative electrode, a third A-separator between the third positive electrode and the third negative electrode, and a ceramic layer which is at least one of between the third positive electrode and the third A-separator and between the third negative electrode and the third A-separator, wherein the first electrode assembly and the second electrode assembly are in and adjacent to an interior surface of the case, and wherein:

the third electrode assembly is between the first electrode assembly and the second electrode assembly and the ceramic layer has an inorganic material different from each of the first and second lithium ion conductor layers, wherein the first A-separator, the second A-separator, and the third A-separator have pores and electrolytic solution.

2. The lithium battery as claimed in claim 1, wherein:
the first electrode assembly includes a first B-separator on at least one of an outer surface of the first positive electrode and an outer surface of the first negative electrode,
the second electrode assembly includes a second B-separator on at least one of an outer surface of the second positive electrode and an outer surface of the second negative electrode, and
the third electrode assembly includes a third B-separator on at least one of an outer surface of the third positive electrode or an outer surface of the third negative electrode.

3. The lithium battery as claimed in claim 1, wherein:
the first lithium ion conductor layer is at least two of on an outer surface of the first positive electrode, between the first positive electrode and the first A-separator, between the first A-separator and the first negative electrode, and on an outer surface of the first negative electrode, and
the second lithium ion conductor layer is at least two of on an outer surface of the second positive electrode, between the second positive electrode and the second A-separator, between the second A-separator and the second negative electrode, and on an outer surface of the second negative electrode.

4. The lithium battery as claimed in claim 1, wherein the first, second, and third electrode assemblies are a jelly-roll type or a stack type.

5. The lithium battery as claimed in claim 1, wherein:
the first positive electrode includes a first positive electrode current collector and a first positive active material layer including a first positive active material,
the first positive active material layer is on at least one surface of the first positive electrode current collector,
the second positive electrode includes a second positive electrode current collector and a second positive active material layer including a second positive active material,
the second positive active material layer is on at least one surface of the second positive electrode current collector,
the third positive electrode includes a third positive electrode current collector and a third positive active material layer including a third positive active material,
the third positive active material layer is on at least one surface of the third positive electrode current collector,
each of the first positive active material and the second positive active material independently include at least one of a lithium-nickel composite oxide represented by Formula 1, an olivine-based phosphoric acid compound represented by Formula 2, a spinel-based lithium-manganese composite oxide represented by Formula 3, and the third positive active material includes a lithium-nickel composite oxide represented by Formula 4, where:

Formula 1 is $Li_a(Ni_xMe_y)O_2$, where Me is at least one of cobalt (Co), manganese (Mn), iron (Fe), vanadium (V), copper (Cu), chromium (Cr), aluminum (Al), magnesium (Mg), and titanium (Ti), with $0.9<a\leq1.1$, $0\leq x<0.6$, $0.4\leq y<1$, and $x+y=1$, Formula 2 is $LiMe'PO_4$, where Me' is at least one of Fe, Mn, Ni, Co, or V;

Formula 3 is $Li_{1+y}Mn_{2-y-z}M_zO_{4-x}Q_x$, where M is at least one of Mg, Al, Ni, Co, Fe, Cr, Cu, B, Ca, Nb, Mo, Sr, antimony (Sb), tungsten (W), Ti, V, Zr, and Zn, and Q is at least one of nitrogen (N), fluorine (F), sulfur (S), and chlorine (Cl), with $0\leq x\leq1$, $0\leq y\leq0.34$, and $0\leq z\leq1$; and Formula 4 is $Li_a(Ni_xM'_yM''_z)O_2$, where M' is at least one of Co, Mn, Ni, Al, Mg, or Ti, M" is at least one of Ca, Mg, Al, Ti, Sr, Fe, Co, Ni, Cu, Zn, Y, Zr, Nb, and B, or a combination thereof, with $0.4<a\leq1.3$, $0.6\leq x\leq1$, $0\leq y\leq0.4$, $0\leq z\leq0.4$, and $x+y+z=1$.

6. The lithium battery as claimed in claim 5, wherein: Me is substituted or doped with at least one heterogeneous element of calcium (CA), magnesium (Mg), aluminum (Al), titanium (Ti), strontium (Sr), iron (Fe), cobalt (Co), nickel (Ni), copper (Cu), zinc (Zn), yttrium (Y), zirconium (Zr), niobium (NB), and boron (B).

7. The lithium battery as claimed in claim 5, wherein the third positive active material includes a lithium-nickel composite oxide represented by Formula 5 which is $Li_a(Ni_xCo_yMn_z)O_2$, where $0.7<a\leq1.3$, $0.6\leq x\leq1$, $0\leq y\leq0.4$, $0\leq z\leq0.4$, and $x+y+z=1$.

8. The lithium battery as claimed in claim 5, wherein:
a thickness of the first positive electrode current collector and a thickness of the second positive electrode current collector are each about 1 to about 2 times greater than a thickness of the third positive electrode current collector, and
a thickness of a first negative electrode current collector and a thickness of a second negative electrode current collector are each about 1 to about 2 times greater than a thickness of a third negative electrode current collector.

9. The lithium battery as claimed in claim 5, wherein a thickness of the first A-separator and a thickness of the second A-separator are each about 1 to about 2 times greater than a thickness of the third A-separator.

10. The lithium battery as claimed in claim 1, wherein the ceramic layer is bonded to at least one surface of the third A-separator.

11. The lithium battery as claimed in claim 1, wherein:
the ceramic layer includes an inorganic material and a binder, and
the inorganic material is one of a metal oxide, a metalloid oxide, a metal fluoride, a metal hydroxide, or a combination thereof.

12. The lithium battery as claimed in claim 11, wherein the inorganic material is one of $Al_2O_3$, $SiO_2$, $TiO_2$, $SnO_2$, $CeO_2$, MgO, NiO, CaO, ZnO, $ZrO_2$, $Y_2O_3$, $SrTiO_3$, $BaTiO_3$, $Mg(OH)_2$, MgF, or a combination thereof.

13. The lithium battery as claimed in claim 11, wherein the binder is one of polyvinylidene fluoride-co-hexafluoropropylene, polyvinylidene fluoride-co-trichloroethylene, polymethyl methacrylate, polyacrylonitrile, polyvinylpyrrolidone, polyvinyl acetate, polyethylene-co-vinyl acetate, polyimide, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxyl methyl cellulose, polyvinyl alcohol, or a combination thereof.

14. The lithium battery as claimed in claim 1, wherein a thickness of the first lithium ion conductor layer and a thickness of the second lithium ion conductor layer are each in a range of about 5 nm to about 500 µm.

15. A lithium battery, comprising:
a positive electrode;
a negative electrode;
a first electrode assembly having a first lithium ion conductor layer;
a second electrode assembly having a second lithium ion conductor layer; and
a third electrode assembly including a ceramic layer which is at least one of between the positive electrode and a separator and between the negative electrode and a separator, wherein the third electrode assembly is between the first electrode assembly and the second electrode assembly and wherein:
the ceramic layer has an inorganic material different from each of the first and second lithium ion conductor layers, and
the lithium battery including a first A-separator, a second A-separator, and a third A-separator each having pores and electrolytic solution.

* * * * *